Oct. 4, 1938.  G. J. STREZYNSKI ET AL  2,131,905
APPARATUS FOR CAUSING REACTION BETWEEN LIQUIDS
AND FOR SEPARATING THE REACTED PRODUCTS
Filed Oct. 23, 1933
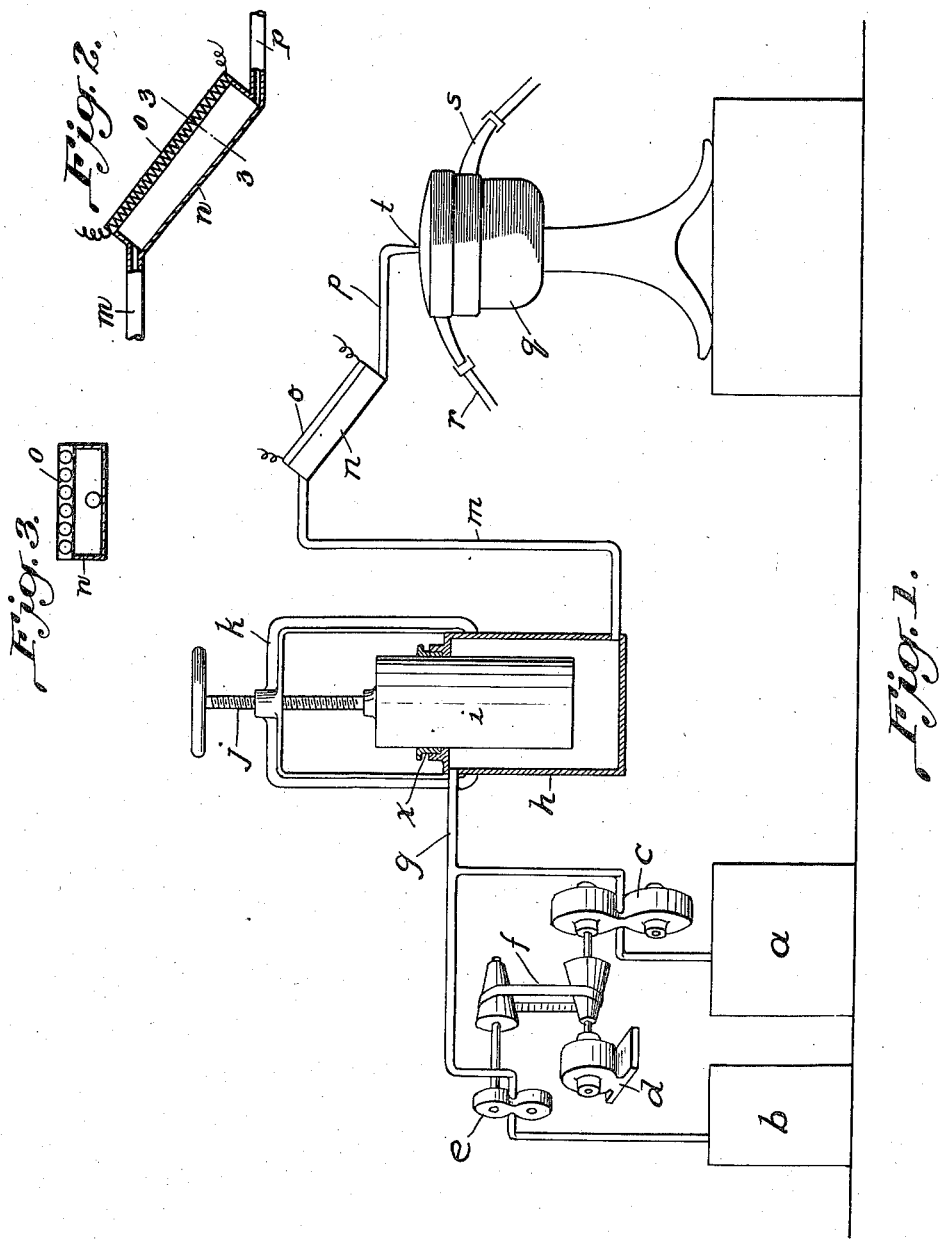
INVENTORS
George J. Strezynski
Walter R. Kronasser
BY
Busser and Harding
ATTORNEYS.
WITNESS:

Patented Oct. 4, 1938

2,131,905

UNITED STATES PATENT OFFICE 2,131,905

APPARATUS FOR CAUSING REACTION BETWEEN LIQUIDS AND FOR SEPARATING THE REACTED PRODUCTS

George J. Strezynski, Poughkeepsie, N. Y., and Walter Kronasser, Graz, Austria, assignors to The De Laval Separator Company, New York, N. Y., a corporation of New Jersey Application October 23, 1933, Serial No. 694,762

3 Claims. (Cl. 196—46)

The object of the invention is to provide an efficient apparatus for causing reactions between liquids and for separating the reacted products. The more specific object of the invention is to so construct the apparatus that the liquids may be mixed in any predetermined proportion, may be caused to interact for any predetermined time, may be heated efficiently without danger of burn-outs or serious diminution in heat supply from solids deposited in the heating chamber, and will have a uniform rate of flow through the system regardless of obstructions tending to interrupt or vary the flow.

It is known to lead the discharges from two pumps, one or both of which have variable capacity, into a common pipe where they are mixed, thence into an open reaction tank or into a closed tank partly filled with gas and which may be filled to a high or low level with the mixed liquids depending on whether a long or short reacting time is desired, and thence through a heater to a centrifuge.

With some materials the reaction products are in the form of sludges that cannot be pumped and that have a strong tendency to collect in pipes and obstruct the flow. With an open tank or with a closed tank partly filled with a gas, any obstruction of pipes by sludge will cause a back pressure that will stop the flow, or at least reduce the rate of flow, with resultant increase of reaction time, and then, when the pressure becomes excessive, the sludge will be blown through and liquids will follow at an excessive rate. With the heaters used in existing systems, there is danger that solid products from the reactions will collect on the heating surface and cause burnouts.

One feature of our invention comprises a system in which all the elements thereof—liquid supply tanks, reaction chamber, heater and centrifuge—are closed except for the conduits allowing communication between adjacent elements. The reaction chamber has a variable capacity, preferably by constructing it with two walls which are relatively movable. The pumps for the liquids are positive delivery uniform speed pumps, so that in case of any obstruction or restriction of the passages, the pressure immediately increases to that required to overcome the obstruction and clear the line, the rate of flow and the time of reaction thus both being constant. A back pressure is preferably maintained in the conduit to the centrifuge in order to insure that the system will be always full of liquid. The heater is so constructed, preferably by heating only the upper wall thereof, that any solids entering the heater will not be deposited on the heated surface but, if they contact therewith, will drop therefrom and deposit on the unheated bottom of the heater or be carried forward to the centrifuge.

As there are now available centrifuges, such as the one shown in Hall Patent No. 1,561,784, through which liquid may be passed without being exposed to air, it is possible, in an apparatus like that described, to treat liquids and separate the reaction products without contact with air.

While the apparatus is usable for other processes, as, for instance, the neutralization of fatty acids in vegetable oils, we will describe it and its use for acid treatment of petroleum products to remove unstable compounds.

Fig. 1 is a diagram of a complete apparatus illustrating one embodiment of the invention.

Fig. 2 is a longitudinal section of the heater and Fig. 3 a transverse section thereof.

$a$ is a tank for oil to be treated and $b$ a tank for acid. $c$ is a pump, driven by a motor $d$, for feeding oil to the treating system and $e$ a similar pump driven by a variable speed mechanism $f$ for feeding acid. A pipe $g$ leads to the reaction tank. This tank comprises an outer shell $h$ and an inner shell $i$. The latter is movable, by a screw $j$ through a yoke $k$, into and out of the outer shell $h$ through a packing ring $x$. Another pipe $m$ leads from the reaction tank to a heater $n$. The heater has the heating element $o$, which may be an electric heater, secured to its top side. A pipe $p$ leads from the heater to the centrifuge $q$, which has an outlet $r$ for the treated oil and an outlet $s$ for the acid sludge. The inlet to the separator at $t$ is smaller than any of the pipe lines and is preferably so restricted as to require a positive pressure to drive the material being treated through it at the desired rate.

The heater has its heating surface at the top side so as to prevent the accumulation of any solids thereon. With the inlet at the upper end and the heater surface at the top, any solid material that may separate out of the oil will fall against the lower side and slide down it to the pipe $p$ through which the rapidly flowing oil will carry it to the separator $q$.

In operation the motor $d$ is adapted to run the pump $c$ at a speed to pump the desired quantity of oil per unit of time. The variable speed drive $f$ is then adjusted to feed the quantity of acid that laboratory tests have indicated to be needed for the oil being treated. By means of the screw $j$ the inner shell $i$ of the reaction chamber is moved up or down, as required, to leave in the chamber the volume that, at the existing rate of feed, will allow the correct time for the reaction to take place. The flow of oil and acid is then started. Just before the first of the mixture reaches the heating tank $n$ enough current is turned on the electric heater $o$ to raise the temperature of the mixture to that desired for good separation of the sludge from the oil.

In cases where the reaction will take place better at the temperature required for separation the heater may be placed before the reaction chamber instead of between the reaction chamber and the separator.

Instead of a reaction chamber consisting of a stationary exterior shell and a movable interior member, it is possible to use a chamber consisting of two rigid flat plates connected by a bellows, or to use a series of smaller chambers in series with pipe and valve arrangements so that all can be used for maximum reaction time or one or more can be by-passed to secure shorter reaction times.

In order that the reaction chamber and heater shall be always full, it is necessary that there be some back pressure on the outlets either by having the separator at a higher level or by having a restriction in the pipe leading to it.

In referring hereinbefore to the variable capacity of the reaction chamber $i$, we refer to the total internal volume of the chamber as distinguished from variation in the volume of liquid reacted on, in a chamber of constant volume, by varying the proportion of the chamber that is filled with liquid. Whatever, therefore, the capacity of the reaction chamber may be, it is not in part filled with gas,—a condition which causes the objectionable operation, hereinbefore described, characteristic of systems herebefore in use.

Because the pumps are positively driven at a uniform speed, any obstruction of flow at any point in the system will result in an increase of the pressure to that required to overcome the obstruction.

What we claim and desire to protect by Letters Patent is:

1. In that type of closed apparatus for causing reaction between liquids and for separating the reaction products which comprises containers for the liquids to be supplied, a reaction tank, means to deliver the liquids from the containers at variable but predetermined relative rates of speed and a centrifuge to which the mixture of reacted liquids is delivered, the improvement which comprises means to vary the volume of the reaction tank in order to adjust the time of reaction, whereby the reaction chamber may be always completely filled while its capacity may be varied to vary the time of reaction.

2. In that type of closed apparatus for causing reaction between liquids and for separating the reaction products which comprises containers for the liquids to be supplied, a reaction tank, a centrifuge and positively driven uniform speed pumps adapted to deliver the liquids through the reaction tank to the centrifuge at a constant rate, the improvement which comprises means to regulably vary the volume of the reaction tank and thereby regulably vary the time of reaction while maintaining the entire apparatus filled with liquid.

3. In that type of closed apparatus for causing reaction between liquids and for separating the reaction products which comprises containers for the liquids to be supplied, a reaction tank, positively driven uniform speed pumps adapted to deliver the respective liquids to the reaction tank, means to vary the volume of the reaction tank, and a centrifuge to which the mixture of reacted liquids is delivered, the improvement which comprises, in combination with said recited elements, means to establish a back pressure upon the mixture flowing from the reaction tank to the centrifuge so as to require a positive pressure to drive the material being treated at the desired rate, thereby insuring the maintenance of the entire system full of liquid and that any leakage will be of liquid outward and not of air inward.

GEORGE J. STREZYNSKI.
WALTER KRONASSER.